US007038581B2

(12) United States Patent
Kendall et al.

(10) Patent No.: US 7,038,581 B2
(45) Date of Patent: May 2, 2006

(54) METHOD FOR ADJUSTING PARAMETERS FOR THE PRESENTATION OF MULTIMEDIA OBJECTS

(75) Inventors: Scott Allan Kendall, Westfield, IN (US); Timothy Lee Turner, Indianapolis, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 232 days.

(21) Appl. No.: 10/625,003

(22) Filed: Jul. 22, 2003

(65) Prior Publication Data

US 2004/0123316 A1   Jun. 24, 2004

Related U.S. Application Data

(60) Provisional application No. 60/405,091, filed on Aug. 21, 2002.

(51) Int. Cl.
*G08B 29/00* (2006.01)
*H04N 7/025* (2006.01)

(52) U.S. Cl. .................. 340/506; 340/525; 340/309.15; 725/33; 725/37

(58) Field of Classification Search ................ 340/509, 340/525, 309.15; 725/33, 37; 348/734
See application file for complete search history.

(56) References Cited

U.S. PATENT DOCUMENTS 6,166,728 A * 12/2000 Haman et al. ............... 715/719
6,177,873 B1   1/2001 Cragun ........................ 340/601
6,760,918 B1 * 7/2004 Rodriguez et al. .......... 725/134

* cited by examiner

*Primary Examiner*—Donnie L. Crosland
(74) *Attorney, Agent, or Firm*—Joseph S. Tripoli; Ronald H. Kurdyla; Joel M. Fogelson

(57) ABSTRACT

A media center operates in two modes where each mode is used for rendering a media object. When a first mode is enabled, a media object is rendered in conformance with parameters within a time duration defined for the operation of the first mode. A second mode is later enabled for rendering a media object, the rendering of the media object is in conformance with parameters within time duration defined for the second mode.

18 Claims, 5 Drawing Sheets

┌─600
                                              ▼
| ALERT SETTINGS | |
|---|---|
| 1. LOCATION | COUNTY MERCER  STATE NJ |
| 2. WEATHER SETTINGS | ADVISORY_  WATCH*  WARNING* |
| 3. HOMELAND SECURITY | MIN: YEL   MAX: RED |
| 4. VISUAL ALARM | TEXT___   GRAPHICS * |
| 5. VISUAL ALARM TIME | START: 6:00    END: 00:00 |
| 6. AUDIBLE ALARM | WARNING BEEP__ VOICE * |
| 7. AUDIBLE ALARM TIME | START: 00:00   END: 12:00 |
| 8. WEATHER ALARM VOLUME | 34 |
| 9. HOMELAND SECURITY ALARM VOLUME | 78 |

FIG. 6

┌─700
                                              ▼
| DEVICE SETTINGS | | |
|---|---|---|
| 1. VIDEO GAME ACTIVE | START: 6:00 | END: 22:00 |
| 2. PVR ACTIVE | START: 8:00 | END: 22:00 |
| 3. DVD ACTIVE | START: 16:00 | END: 22:00 |

METHOD FOR ADJUSTING PARAMETERS FOR THE PRESENTATION OF MULTIMEDIA OBJECTS

This application claims the benefit under 35 U.S.C. § 119(e) of Provisional Application 60/405,091 filed Aug. 21, 2002 in the United States patent and Trademark Office.

FIELD OF THE INVENTION

This invention relates towards the field of modifying parameters influencing the rendering of media objects.

BACKGROUND OF THE INVENTION

A user operated audio or video device (multimedia device) such as a digital versatile disc (DVD) player or an audio/video receiver typically supports a plurality of parameters that affect the output of audio or video. For example, a DVD player playing a media object such as a movie from a DVD disc may have parameters changed where a user may want to view video presented in a 16:9 instead of a 4:3 aspect ratio. A user operating the multimedia device has to designate specific audio and video parameters in order to have the playback of a media object change. In the DVD player example, a user instructs the DVD player to provide video in a 16:9 aspect ratio from the previously used 4:3 image aspect ratio. This example equally applies to audio parameters that affect the playback of audio.

A user operating a multimedia device with many different operating parameters has to have a sufficient understanding of the parameters represent to fully utilize the capabilities of the multimedia device. Some users leave multimedia devices with pre-selected factory-selected or default parameters because the users do not know about what the parameters effect or how to adjust such parameters. For example, a user may not know the differences between stereo and surround sound audio modes. The multimedia device then performs at a sub-optimal level when outputting a media object, because the default audio and video modes typically offer a compromise that does not take full advantage of the capabilities of the multimedia device (for example, a DVD player operates in a stereo default mode (home quality) instead of Dolby 5.1 (movie theater quality).

Furthermore, a user may want to have a multimedia media device operate with different parameters during different times of the day, for example a user may want a media object such as a movie be rendered in a lower volume at night, versus in a loud setting during the day time. Currently, devices do not offer a simple way of enabling such user preferences.

A user must also consider the operation of a media center, in light of the addition of an emergency alarm notification system. Many multimedia devices will include such alarm systems, in case of a weather or national security emergency, where the parameters set up by a user may have to be overridden to receive notification of an emergency situation. Ideally, a user may want to exercise control over the types of alarms, and when such alarms are presented.

SUMMARY OF THE INVENTION

A method is disclosed for the operation of a media center in two different modes of operation, each mode is used for rendering a media object. A first mode is enabled, where a media object is rendered in conformance with parameters within a time duration defined for the operation of the first mode. A second mode is later enabled for rendering a media object, where the rendering of the media object is in conformance with parameters within time duration defined for the second mode.

BRIEF DESCRIPTION OF THE DRAWINGS

FIG. 6 represents an illustration of alert settings, in accordance with an exemplary embodiment of the invention.

FIG. 7 represents an illustration of device settings for devices that are part of media center, in accordance with an exemplary embodiment of the present invention.

DETAILED DESCRIPTION OF THE INVENTION

As used herein, multimedia data represents a media object. The term media object includes audio, video, textual, multimedia data files, streaming media files, alarm notification, and broadcast programming. Multimedia data comprise any combination of text, image, video, and audio data. Streaming media comprises audio, video, multimedia, textual, and interactive data files that are delivered to a user's computer or multimedia device (as a television set, display device, media center, radio, and the like) via the Internet or other communications network environment and begin to play on the user's computer/device before delivery of the entire file is completed. One advantage of streaming media is that streaming media files begin to play before the entire file is downloaded, saving users the long wait typically associated with downloading the entire file. Digitally recorded music, movies, trailers, news reports, radio broadcasts and live events have all contributed to an increase in streaming content on the Web. In addition, the reduction in cost of communications networks through the use of high-bandwidth connections such as cable, DSL, T1 lines and wireless networks (e.g., 2.5G or 3G based cellular networks) are providing Internet users with speedier, more reliable access to streaming media content from news organizations, Hollywood studios, independent producers, record labels and even home users themselves. Broadcast programming represents data transmitted as television or radio programming.

Figure 1:
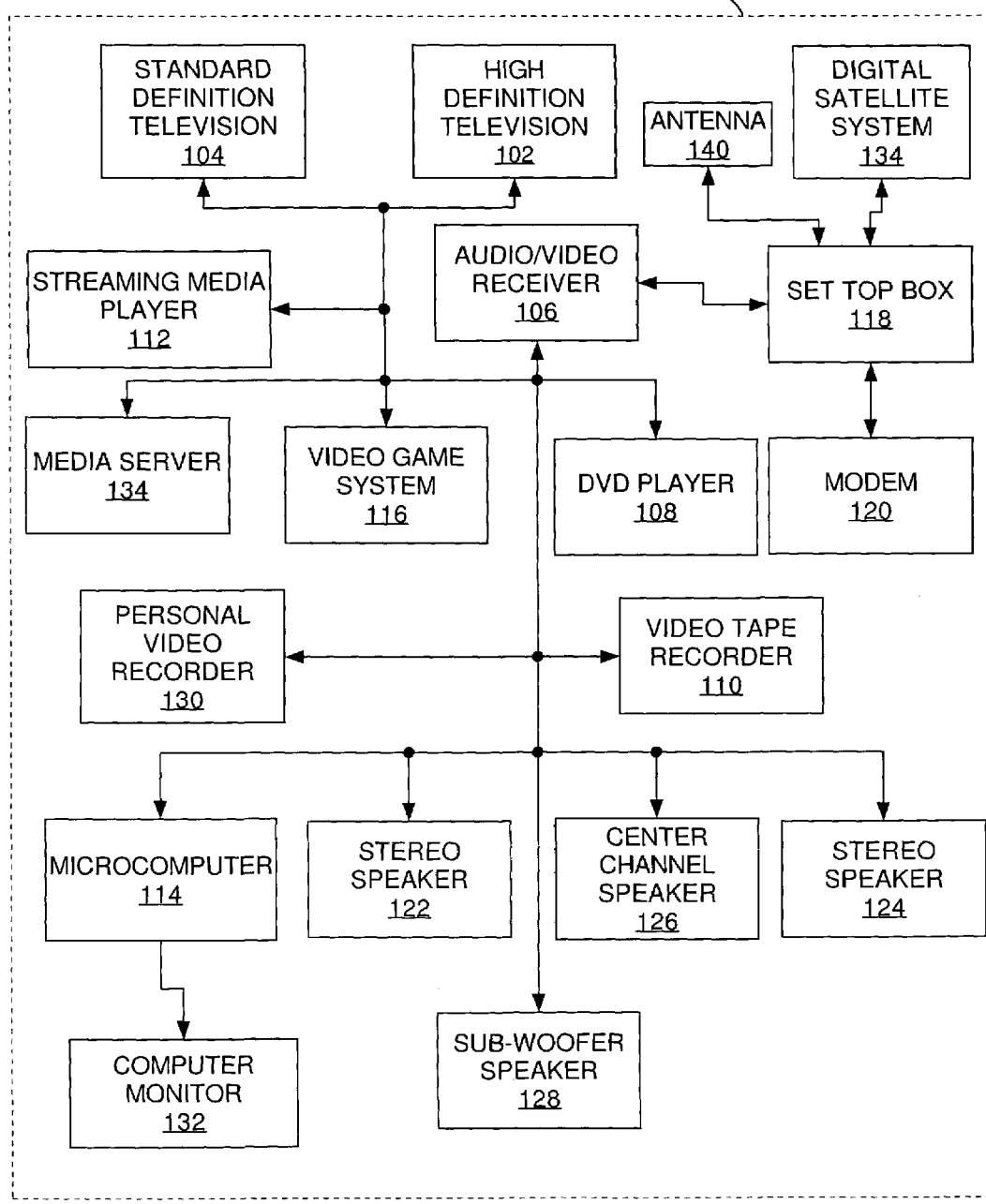
FIG. 1 is a diagram of a media center system, according to an exemplary embodiment of the invention.

In FIG. 1, interconnected audio and video multimedia devices in a media center 100 constitute a plurality of connected multimedia devices. The multimedia devices forming media center 100 are preferably connected through a wire-based interface (e.g., RCA cables, Ethernet, coaxial cable, phone lines, IEEE-1394 compliant cables, copper wire, serial cables, optical cable, USB) that provides bidirectional communication between devices. Optionally, the multimedia devices comprising media center 100 communicate through a wireless interface (e.g., radio frequency, infrared, BLUETOOTH™, 802.11B, 802.11A). Alternatively, the communications are unidirectional where one multimedia device is a controller (master) and other multimedia devices (slaves) respond to the controller.

The communications between the multimedia devices comprises two levels of information: multimedia signals (media objects) that are generated and processed by selected audio and video output modes available from a plurality of connected multimedia devices, and the control information used to manage the interconnected multimedia devices. The information transmitted is in digital or analog format or a combination thereof. For example, the multimedia signals generated by a DVD player 108 outputting a movie are a stereo audio signal provided as an output for a stereo audio mode and a 1080 horizontal line by 1920 pixel 60 Hz interlaced output video signal provided for a HD (high definition) video mode. The control commands are preferably JAVA™ or XML compliant signals that comport to a packet-based structure (TCP/IP). These commands are capable of being processed by a data interface/controller preferably residing internal in the multimedia devices. Control information may be communicated as an electric circuit parameter (e.g., voltage, resistance, current, inductance, capacitance) and/or a change in a parameter of an electric signal (e.g., a change in resistance or voltage). As an alternative embodiment, the information transmitted on both levels of information is in the form of metadata that complies with a proprietary standard as Home Audio Video Interoperability (HAVI), Motion Picture Standards Group Standard 7 (MPEG-7, identified as ISO/IEC JTC1/SC29/WG11), Rendezvous, or other standard controlling the operation of devices in a media center environment.

Set top box 118, from FIG. 1, receives media objects as multimedia signals from remote sources and distributes the objects to other interconnected multimedia devices of media center 100. Media object may be audio programming (e.g., music, radio based talk show, streaming audio) and/or video services (e.g., television shows, movies, computer/video games) capable of being provided by media center 100 in selected audio and video output modes. A remote source (e.g., satellite, Internet, cable, broadcast antenna, public switched telephone network (PSTN), cellular network, infrared transmitter), as a service provider, transmits media objects as signals that are received by multimedia devices including as digital satellite system 134, modem 120, and antenna 140. These devices process the media objects signals and distribute media objects through the media center 100 for use by other multimedia devices connected to audio/video receiver 106. Multimedia devices such as digital satellite system 134 and modem 120 may bi-directionally communicate with remote sources for requesting media objects (for example, a video on demand from a cable service provider) and for performing maintenance for media center 100 (e.g., downloading a new audio output mode, receiving electronic program guide information, upgrading software drivers and codecs).

Media center 100 also accommodates and distributes media objects available from local sources. DVD player 108, video tape recorder 110, personal video recorder 130, coupled to the audio/receiver 106, are examples of multimedia devices that provide media objects locally (for example, video tape recorder 110 playing a movie from a video tape) through the use of a swappable medium (e.g., video tape, DVD, computer disc, flash memory, compact disc). Other multimedia devices such as media server 134 and a streaming media player 112, coupled to audio/receiver 106, provides locally sourced media objects from a local fixed storage device (e.g., hard disc drive, optical disc, flash or static ram). Media objects stored in the local storage device may be received from remote sources or from other multimedia devices connected to media server 134 and archived. Other media objects are provided locally by software running on a microcomputer 114 or from video game system 116. These services are distributed to other connected multimedia devices of media center 100.

Media center 100 uses multimedia devices for processing and outputting media object signals in accordance with selected audio and video output modes. Audio/video receiver 106 is a multimedia device that matches a source of a media object to multimedia devices that process and output the media object in a selected audio or video output mode. For example, DVD player 108 distributes an HD video media object (of a local or remote origin) via audio/video receiver 106 to high definition television set 102. Audio/video receiver 106 preferably selects sources and multimedia devices via the use of control commands, as used in HAVI, Rendezvous, or other standard controlling the operation of devices in a media center environment. Preferably audio/video receiver 106 selects standard definition television set 104 for displaying SD media object information and high definition television set 102 for displaying HD media objects. Computer monitor 132 display locally generated information from microcomputer 114

Audio media objects are provided through audio multimedia devices available in the media center 100. Preferably, audio media object (of local or a remote origin) is reproduced by an audio system comprising a group of loudspeakers comprising at least one of stereo speaker 122, stereo speaker 124, center channel speaker 126, and sub-woofer speaker 128. Optionally, standard definition television set 104, high definition television set 102, or the computer monitor 132 is used to output an audio media object signal via an audio component in the multimedia device (e.g., a loudspeaker). Audio/video receiver 106 can choose a group of speakers from the audio system in accordance with a selected audio output mode, wherein a second group of speakers is chosen when the selected audio output mode changes.

Media center 100 is operated through use of a user interface (UI) and/or a series of menus are used for controlling the operation of any of the components that comprise media center 100. A user selects and adjusting a parameter corresponding to a function of media center 100 via such UIs and/or menus. UI and menus are generated for display on a display device by an on screen display (OSD), video card, video processor, software, or other known means of controlling video, as known in the art.

In a preferred embodiment, UIs and/or menus are controlled with a control device as a remote control with a series of switches corresponding to numbers, letters, directional arrows, and other such identifying indicia. The switches are operated to a parameter or mode of operation of media center 100. Control devices also include an interface as a mouse, pointer device, hardwired controller, keyboard, and the like. The use of a control device to control media center 100 via control device data, is known in the art.

Optionally, the control device includes a means for operating a pointer or arrow used for change an operating parameter of media center 100. For example, the remote control includes a joystick that controls a displayed pointer that is presented to control a user interface and/or menu.

When a user operates the joystick, the pointer is moved to select and change options controlling media center 100. Other control means may be used, in accordance with the principles of the present invention.

Figure 2:
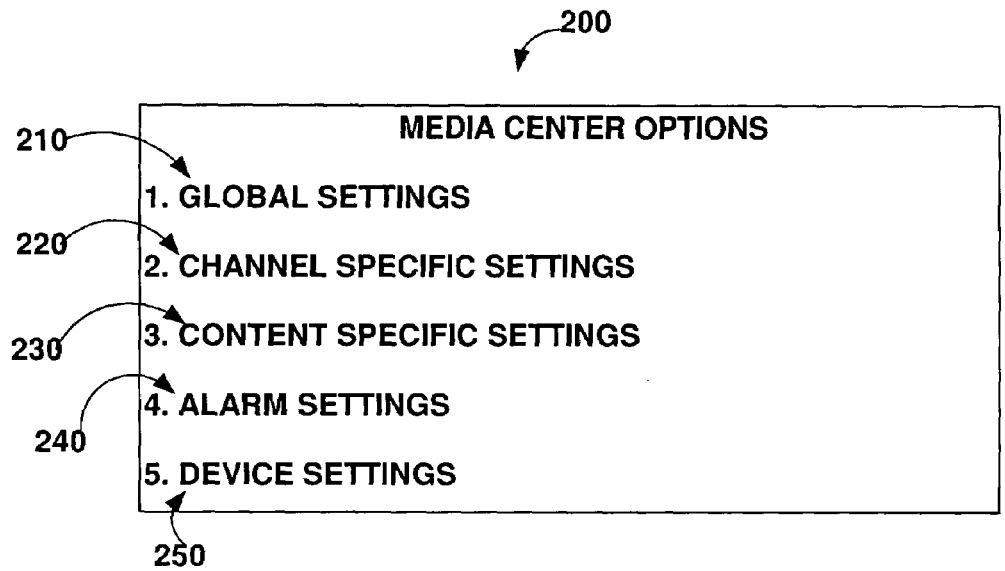
FIG. 2 represents an illustration of media center options menu, in accordance with an exemplary embodiment of the invention.

FIG. 2 represents an illustration of media center options menu, in accordance with an exemplary embodiment of the invention. Specifically, a media center options menu 200 is presented listing parameters that are controlled by a control device. Menu 200 represents the top level of a hierarchical system of menus used for controlling media center 100. A user may transverse levels of the hierarchical menu system by selecting the options displayed for menu 200, for example by pressing a switch, operating arrow keys, using a pointer and the like.

In the present embodiment of the invention, a user uses switches on a control device to change operational parameters of media center 100. For example, when the user presses the '1' key, a menu corresponding to global settings 210 is generated (as presented in FIG. 3) Similarly, if the user presses the '3" key, the menu corresponding to content specific settings 230 is generated (as presented in FIG. 5). Other displayed options are controlled in a likewise manner.

For media center options menu 200, global settings 210 represents parameters that globally effect the operation of media center 100. Channel specific settings 220 menu are options that control the presentation of a media object received via a broadcast channel such as television programming. Content specific settings 230 are options involving the presentation of media object based on the object's content type. Alarm settings 240 controls the presentation of alarm-based information for events such as weather emergencies. Device settings 250 are parameters controlling the operation of components that make up media center 100, such as DVD player 108 or PVR 130.

Figure 3:
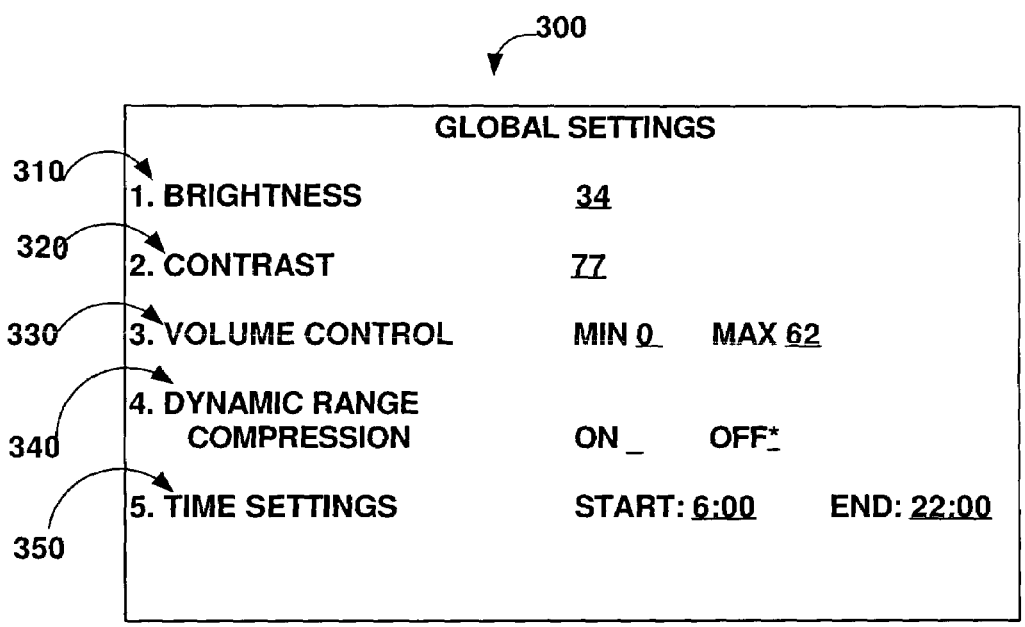
FIG. 3 represents an illustration of global settings menu, in accordance with an exemplary embodiment of the invention.

FIG. 3 represents an illustration of global settings menu, in accordance with an exemplary embodiment of the invention. These parameters effect the overall operation of media center 100. A user may override such options via a control device, but the global setting parameters default back after the media center 100 is reset, powered back on, or the time duration defined for the application of the global settings as operational parameters commences.

Brightness 310 and contrast 320 represent two types of video parameters, as global settings, that are adjusted affecting video presented via media device 100. Brightness 310 determines how much light is used for displaying video. A higher value represents that the video of a media object is displayed with more light, than if a lower number is selected. Contrast 320 is the difference between the light and dark areas shown on a rendered video display. Hence, a higher value of contrast represents more definition between light and dark areas, over a lower value of contrast. Other video settings such as tint, color, and the like may be selected as needed.

Volume control 330 determines the range of volume for a device, where the minimum (MIN) and maximum (MAX) values for volume are values selected from 0 to 99. The higher the value selected for volume, the louder the sound of a media object is rendered by media center 100. Dynamic range compression 340 controls the presentation of audio, where a higher dynamic range is presented between "soft" and "loud" sounds, when the option is off. If the option is on, less of a dynamic range is used when rendering such "soft" and "loud" sounds.

Time settings 350 determine a duration of time when global options 300 are active. Time settings are entered in a military time format using a HH:MM. The time duration, defined by a starting time and an ending time, corresponds to parameters used to operate media center 100. The duration of time begins when the local time of media center 100 is the same as the listed starting time, and the duration of time terminates when the local time is the same as the listed ending time. The operation of media center 100 may be adjusted at will after the expiration of such a time duration provided that no other time durations are specified for the operation of media center 100.

Time settings 350 may be used by a parent for restricting the use of media center 100 to specific operations during certain times of the day. The parent designates, in this example, that the volume of audio produced by media center 100 be restricted to a low value in the evening Furthermore, the parent restricts other operational parameters of media center 100 where the video, audio, and/or selected devices of media center 100 are also restricted during select times of the day. This example only serves to illustrate only one application of the invention as other applications of the invention may be utilized using the principles of the present invention.

Figure 4:
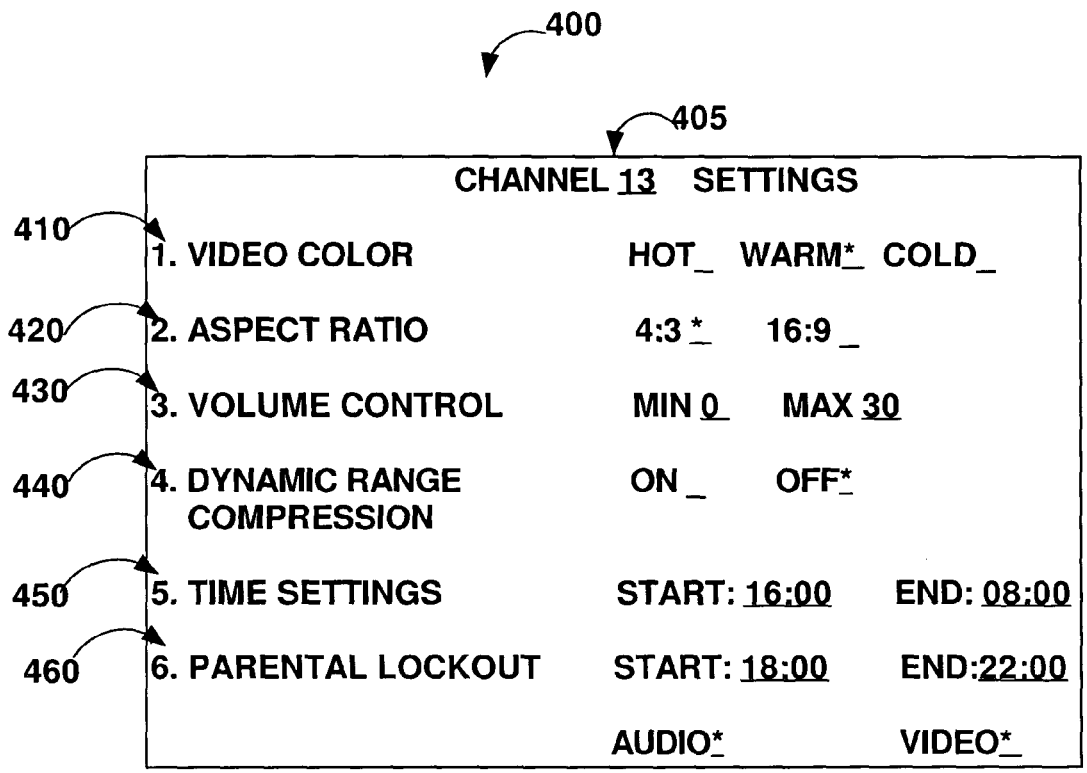
FIG. 4 represents an illustration of channel settings, in accordance with an exemplary embodiment of the invention.

FIG. 4 represents an illustration of channel settings, in accordance with an exemplary embodiment of the invention. Channel settings 400 menu lists the audio and video options corresponding to a selected channel used to receive a media object, as indicated in channel selection 405. Video color 410 are color options representing color temperatures such as hot, warm, and cold that are used to change the color of video representing a media object from a specific channel. Aspect ratio 420 represents a selectable option for a user to change the aspect ratio of video from a particular channel, either as a 4 by 3 aspect ratio (4:3) or a 16 by 9 aspect ratio (16:9). Volume control 430 and dynamic range compression 440 represent similar options, as listed for global settings 300. The only difference is that volume control 430 and dynamic range compression 440 correspond to a selected channel, instead of being the default parameters for a device.

When a user defines channel settings 400 for a particular channel, these parameters are saved in memory and will be used whenever the user selects such a channel. Preferably, channel settings 400 corresponding to a selected channel are used over the global settings 300 that represent the default operating parameters for a device.

Time settings 450 define the duration of time for the operation of the parameters selected as channel settings 400. This duration of time is specific to the channel noted in channel selection 405. The duration of time begins when the local time of the media object is the same (or is after) the listed starting time, and the duration of time terminates when the local time is the same as the listed ending time.

An apparent conflict may arise between the operation of global settings 300 and channel settings 400 in regards to the use of time settings. For example, at certain times of the day, the duration time of defined by time settings 350 may overlap the time duration corresponding to time settings 450. If this is the case, time settings 450 and the parameters corresponding to the duration of time defined by time settings 450 takes precedence over the parameters corresponding to global settings 300. When the duration of time corresponding to channel settings 400 expires, global settings 300 become active if the local time of media center 100 is within the duration of time corresponding to global settings 300. An alternative embodiment of the invention provides the case where the duration of time corresponding to global settings 300 takes priority over the duration of time corresponding to channel settings 400.

Parental lockout 460 indicates time duration of when parental controls for a channel are in effect. Parental lockout 460 controls whether audio and/or video a particular channel are active during the selected time period. For example, if a parent selects the audio active option with parental lockout 460, a child would only be able to hear the volume from a selected channel during the times of the parental lock out. Similarly, if a parent specifies the video active option, video would only be shown for a selected channel, during the period for which the parental lockout is in effect. When parental lockout 460 is disabled, the audio and video are rendered for a selected channel. A parent using a password or other type of access code via a control device may override the parental lockout option, if desired.

Figure 5:
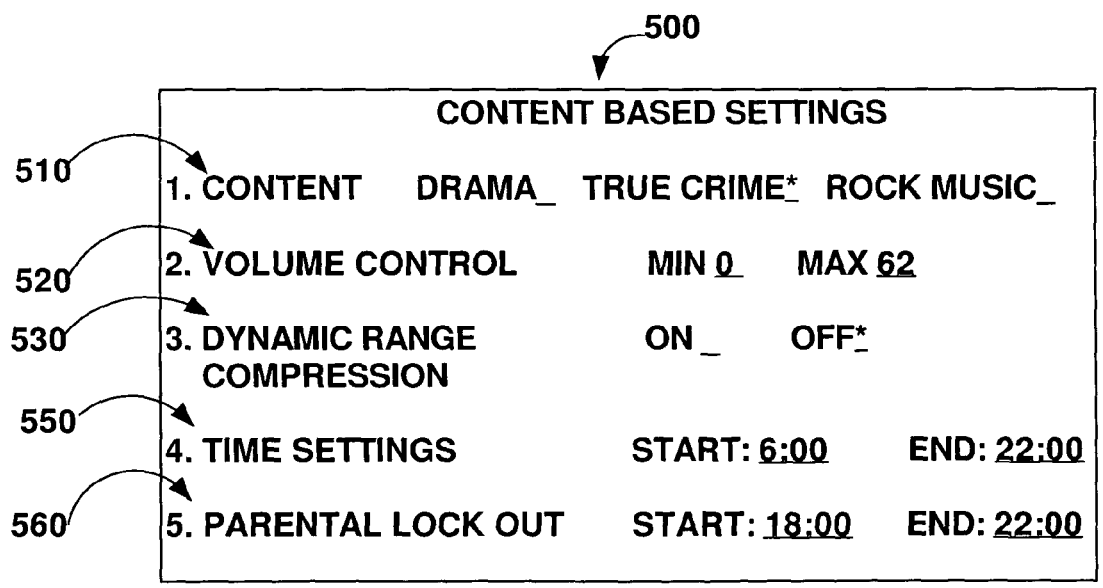
FIG. 5 represents an illustration of content based settings, in accordance with an exemplary embodiment of the invention.

FIG. 5 represents an illustration of content based settings, in accordance with an exemplary embodiment of the invention. Content based settings 500 are parameters that depend upon the content of a media object being rendered by media system 100. For example, media content are fields such as subject, title, category, and the like. Media device 100 determines the content of a media object by metadata in an electronic program guide listing such a media object, metadata present in an MPEG-7 based descriptor of the media object, extendable markup language (XML), and other forms of identifying indicia used to identify media content of a media object.

In an exemplary embodiment of the invention, media content 510 represents the different type of media content able to be identified by the system. This example uses drama, true crime, and rock music, as three types of media content identified by media center 100, although other types of media content may be used. A user is able to select settings for each of these types of media content by adjusting the setting of media content type 510. In this example, the content based settings for drama are indicated in content based settings 500. The use of volume control 520, dynamic range compression 530, time settings 550, and parental lock out 560 operate similarly as represented for global settings 300 and channel settings 400, as listed above. Additionally, each content type would have its own set of unique parameters, for example media content identified of the type of drama would not have dynamic range compression 530 active, while rock music would probably utilize dynamic range compression 530.

In a preferred embodiment of the present invention, options for content based settings 500 takes precedence over options selected for global settings 300. Optionally, a user specifies whether content based settings 500 takes precedence over channel settings 400, or vice-versa. This type of option would be presented to a user via a menu list, or other type of controller interface, in accordance with the principle of the present invention.

FIG. 6 represents an illustration of alert settings, in accordance with an exemplary embodiment of the invention. Alert settings 600 represents a combination of weather alert and homeland security notifications allowing a user to manage the alerts, as media objects, as rendered by media center 100. In a preferred embodiment of the invention, media center 100 is capable of receiving alert information related to weather alerts (such as tornado, thunderstorm, snow, hail, and other types of weather) and homeland security (the homeland security advisory system, as established by United States Department of Homeland Security). The alert information is generated in the form of text, graphics, sound, and a combination thereof.

Location setting 610 provides an area of a user to enter in the County and State of the user's location. Preferably, a user can scroll through the listed Counties and associated States by using a drop down menu rendered as part of alert settings menu 600. Media center 100 uses the entered in County and State information to determine a Federal Information and Processing Standards (FIPS) code that corresponds to the user's location, preferably by using a locally stored database containing such associations. The FIPS code corresponds to a location used for the National Weather Service in the Specific Area Message Encoding (SAME) system for reporting weather alert information. The FIPS code is used by media center 100 in a manner similar to weather alert radios, as known in the art, to select what types of alerts to render.

Weather settings 620 provide an option to adjust the reporting of the different classes of weather alerts. For an exemplary embodiment of the invention, three types of alerts are reported: advisory, watch, and warning. An advisory is a weather condition that may happen over the next day or two. A watch alert is for a weather condition that is expected in a few hours. A weather warning is a hazardous weather condition that is imminent. Hence, when the FIPS code of a weather alert matches the FIPS code of media center 100, the weather alert is reported providing that the class of the weather alert is selected as active for weather settings 620.

Homeland security 630 is used to designate the types of alarms reported for a homeland security alert, according to the homeland security advisory system. Currently, five alert conditions are used in the system, where each condition corresponds to a color. Green represents a low condition indicating a low risk of a terrorist attack. Blue represents a guarded condition for indicating a probably of a general terrorist attack. Yellow indicates an elevated condition for a significant risk of a terrorist attack. Orange is for used to indicate a high condition of a terrorist attack. Red is used for serve conditions, for when a terrorist attack is most likely. In the preferred embodiment of the invention, the geographical information developed for determining a FIPS code for weather alerts is used for homeland security alerts, as well. Hence, an alert situation for one location would not necessarily apply for a second geographic area. The nature of what the homeland security alert represents may change, as the U.S. Department of Homeland Security adjusts to threat situations and incorporates new types of alerts. Media center 100 is capable of being updated with such information, as needed.

Homeland security 630 indicates a range of alerts to be reported. In the present example, the alarms reported range from Yellow (MIN) to Red (Max). The upper and lower ranges may be adjusted upon the needs of a user.

Visual alarm 640 determines the type of alarm rendered during an alert, as either text (such as flashing text) or graphics (such as icons, colored symbols, and the like). Audible alarm 660 indicates whether an alarm is sounded as a beeping sound or in a voice form (the voice form either being broadcasted as part of the alarm signal or computer generated). Visual alarm time 650 determines the times for when a visual alarm is rendered by media center 100. By adjusting the settings of audible alarm time 670, a user establishes the time of day when weather and home security alarms are heard. It is to be noted that these alarm settings always take precedence over global settings 300, channel settings 400, and content settings 500.

Alarm volume 680 is the volume of a weather alert or home security alert when rendered audibly. These types of alerts tend to be of a less serious nature, such as a thunderstorm or when the home security advisory system changes from green to blue. Homeland security alarm volume 690 is for alerts of a various serious nature, as a red condition corresponding to a severe condition of terrorist activity. Optionally, a user may classify different events to apply for alerts (controlled by alarm volume 680) and homeland security alerts (controlled by homeland security alarm volume 690). Such a classification process is accomplished in accordance with the principles of the present invention.

FIG. 7 represents an illustration of device settings for devices that are part of media center 100, in accordance with an exemplary embodiment of the present invention. Device settings 700 is a control interface that allows a user to specify which components of media center 100 are active, during specific times of the day. The device settings determine a time duration for the operation of such devices. Moreover, these times may also be used to establish when the selected options in global settings 300 are active for any of these components. Video Game Active 710 applies to video game system 116, PVR active 720 applies to the operation of PVR 130, and DVD active 730 controls the period of operation of DVD player 108. Devices of media center are enabled, disabled, and are controlled using commands via a multimedia standard such as HAVI, Rendezvous, or other standard controlling the operation of devices in a media center environment. Optionally, a parental control option is offered for a parent to activate or disable specific devices at specified times of the day. This option operates similarly to parental lockout 460.

Figure 8:
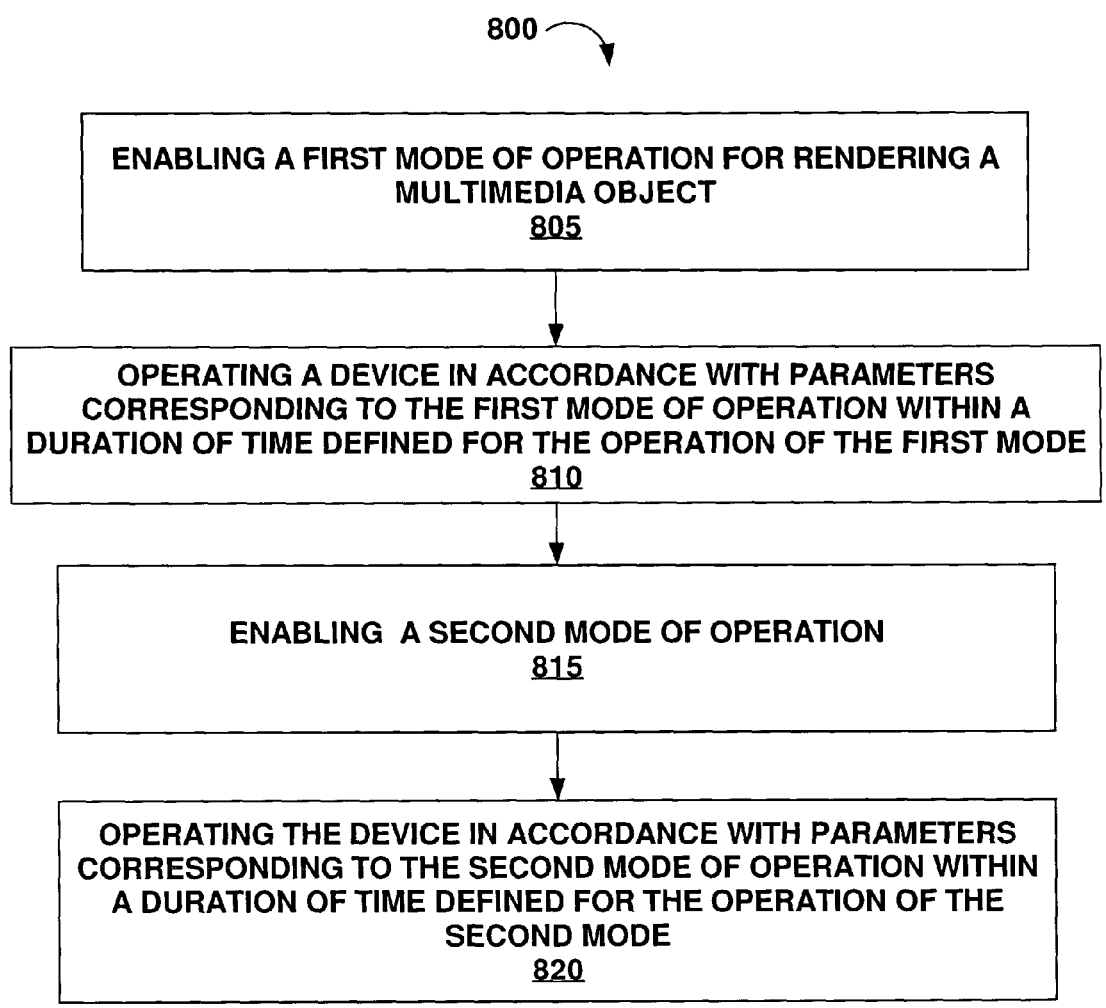
FIG. 8 represents a block diagram illustrating an operation of two modes that control the rendering of a media object, in accordance with an exemplary embodiment of the present invention.

FIG. 8 represents a block diagram of the operation of media center 100 between two different modes of operation controlling the rendering of a media object, in accordance with an exemplary embodiment of the present invention. Step 805 of method 800 enables a first mode of operation for rendering a media object. Such a step pertains to an activity as selecting a television channel, using DVD player 108, or any other component of media center 100 used for rendering a media object.

In step 810, the device or devices used to render a media object operate in accordance with the parameters corresponding to the first mode of operation. The first mode is associated with a duration of time for when such parameters are active. For example, in step 805, a user selects a television channel 13 which provides a media object of audio and video programming rendered via a display device and sound system, as part of media center 100. Currently, the local time of operation for media center 100 is 03:00 that is within the time duration defined by time settings 450. During this time duration, according to the parameters listed in FIG. 4, the audio of channel 13 is set to a maximum level of 30.

After a local time of 08:00, the settings specified in channel settings 400 become inactive. Because the local time is now within the duration of time defined by time settings 350, from 06:00 to 22:00, global settings 300 become active. The new time duration activates a second mode of operation in step 815. In accordance with this second mode, the volume level is raised from a maximum value of 30 to 62, as indicated in FIG. 3, for volume control 330. This example shows media center 100 operating in accordance with parameters corresponding to a second mode of operation within a second duration of time. Channel settings 400 will become active again when the local time reaches 16:00, the beginning of the time duration defined by time settings 450.

In an alternative embodiment of method 800, media center 100 operates in an alarm mode. For example, in step 805, media center 100 indicates a thunderstorm weather warning, such an indication representing a first mode of operation. Because the local time is 23:30, the alarm would be rendered visually, in accordance with the time duration specified in FIG. 6, as visual alarm time 650. In step 810, the first mode with a video graphics of the thunderstorm alarm situation are displayed. When the time changes to 00:00, step 815 activates a second mode of operation, terminating the visual alert and enabling a second mode of operation, an audible alarm. In step 820, the audible alarm starts at a volume level of 34, in accordance with audible alarm time setting 670 and alarm volume 680. The use of audio and visually rendered alarms may overlap, as one skilled in the art may select to utilize a combination of audio and video alarms, in accordance with the principles of the present invention.

The principles of the present invention also apply to a situation where more than two operating modes in the operation of media center 100. In an illustrative example, the invention utilizes three modes for rendering a media object: a video only mode from 00:00 to 12:00, an audio mode from 12:00 to 18:00, and a combination audio and video mode from 18:00 to 20:00. Depending on the time of day, the operational mode of the media center may be any of these three modes. A fourth mode may be utilized, from 20:00 to 00:00, where no audio or video is rendered. Other uses and other operating modes may be applied, as desired.

The present invention may be embodied in the form of computer-implemented processes and apparatus for practicing those processes. The present invention may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

What is claimed is:

1. A method for operating a media center rendering a media object comprising the steps of:

enabling a first mode of operation for rendering the media object;

operating the media center in accordance with parameters corresponding to the first mode of operation within a duration of time associated with the operation of the first mode;

enabling a second mode of operation for rending the media object;

operating the media center in accordance with parameters corresponding to the second mode of operation within a duration of time association with the operation of the second mode, wherein one of the parameters used for rendering the media object is changed from the first mode of operation to the second mode of operation.

2. The method according to claim 1, wherein the first mode of operation is for an alarm notification and the second mode of operation is for a second alarm notification.

3. The method according to claim 1, wherein the parameters change an audio function of the media center.

4. The method according to claim 1, wherein the parameters change a video function of the media center.

5. The method according to claim 1, wherein a parental lock out mode corresponds to the first mode of operation, wherein the parental lock out prevents audio and video from being viewed during the duration corresponding to the first mode of operation.

6. The method according to claim 5, wherein the parental lock out mode further restricts the content rendered via a media center according to selected options in a rendered menu.

7. The method according to claim 1, wherein the first mode of operation restricts the use of a device of the media center, wherein the option to restrict the device is made by using a second device of the media center.

8. The method according to claim 1, comprising an additional step of:
enabling a third mode of operation for rending the media object;
operating the media center in accordance with parameters corresponding to the third mode of operation within a duration of time association with the operation of the third mode, wherein one of the parameters used for rendering the media object is changed from the second mode of operation to the third mode of operation.

9. A method of rending alarms for a media center comprising the steps of:
specifying a type of alert to be rendered by a media center, wherein type of alert corresponds to a hierarchical level of alerts;
determining a first parameter controlling the rendering of the alert;
defining a first duration of time for the activation of the alert;
determining a second parameter controlling the rendering of the alert;
defining a second duration of time for the activation of the alert;
wherein the alert is rendered with the first parameter during the first duration of time, and the alert is rendered with the second parameter during the second duration of time when a local time changes from matching the first duration of time to the second duration of time; and
the alert corresponds to the level of alerts selected during the specifying step.

10. The method of claim 9, wherein the alarm is at least one of: a weather alarm, and homeland security alarm.

11. A method for operating a media center with a media object comprising the steps of:
enabling a first mode of operation for generating a first signal comprising the media object;
operating the media center in accordance with parameters corresponding to the first mode of operation within a duration of time associated with the operation of the first mode;
enabling a second mode of operation for generating a second signal comprising the media object;
operating the media center in accordance with parameters corresponding to the second mode of operation within a duration of time association with the operation of the second mode, wherein one of the parameters used for generating the first and second signals comprising the media object is changed from the first mode of operation to the second mode of operation.

12. The method according to claim 11, wherein the first mode of operation is for an alarm notification and the second mode of operation is for a second alarm notification.

13. The method according to claim 11, wherein the parameters change an audio function of the media center.

14. The method according to claim 11, wherein the parameters change a video function of the media center.

15. The method according to claim 11, wherein a parental lock out mode corresponds to the first mode of operation, wherein the parental lock out prevents audio and video from being viewed during the duration corresponding to the first mode of operation.

16. The method according to claim 15, wherein the parental lock out mode further restricts the content being rendered via a media center according to selected options in a rendered menu.

17. The method according to claim 11, wherein the first mode of operation restricts the use of a device of the media center, wherein the option to restrict the device is made by using a second device of the media center.

18. The method according to claim 11, comprising an additional step of:
enabling a third mode of operation for generating a third signal comprising the media object;
operating the media center in accordance with parameters corresponding to the third mode of operation within a duration of time association with the operation of the third mode, wherein one of the parameters used for generating the second and third signals comprising the media object is changed from the second mode of operation to the third mode of operation.

* * * * *